US012244090B2

(12) United States Patent
Yoshiura et al.

(10) Patent No.: US 12,244,090 B2
(45) Date of Patent: Mar. 4, 2025

(54) ELECTRIC CONNECTOR

(71) Applicant: SMK Corporation, Tokyo (JP)

(72) Inventors: Yasuo Yoshiura, Kanagawa (JP); Kensuke Watanabe, Tokyo (JP)

(73) Assignee: SMK Corporation, Tokyo (JP)

( * ) Notice: Subject to any disclaimer, the term of this patent is extended or adjusted under 35 U.S.C. 154(b) by 484 days.

(21) Appl. No.: 17/867,690

(22) Filed: Jul. 19, 2022

(65) Prior Publication Data

US 2023/0246377 A1 Aug. 3, 2023

(30) Foreign Application Priority Data

Feb. 3, 2022 (JP) ................................ 2022-015602

(51) Int. Cl.
*H01R 13/00* (2006.01)
*H01R 13/506* (2006.01)
*H01R 13/639* (2006.01)

(52) U.S. Cl.
CPC ......... *H01R 13/506* (2013.01); *H01R 13/639* (2013.01)

(58) Field of Classification Search
CPC ............................ H01R 13/506; H01R 13/639
See application file for complete search history.

(56) References Cited

U.S. PATENT DOCUMENTS 8,172,817 B2 * 5/2012 Michaels ................ G01F 23/02 604/326
9,478,923 B2 * 10/2016 Kao ................... H01R 13/6471
9,564,716 B2 * 2/2017 Kao ................... H01R 13/6586
9,774,138 B1 * 9/2017 Peng ...................... H01R 24/20
9,780,500 B2 * 10/2017 Kao ................... H01R 13/6658
9,847,607 B2 * 12/2017 Bopp ................... H01R 4/2429
9,923,298 B2 * 3/2018 Hashimoto ........ H01R 13/5025
2005/0159047 A1 7/2005 Takahashi
2008/0139034 A1 * 6/2008 Dieterle ............... H01R 12/716 439/352
2011/0294334 A1 * 12/2011 Phillips ................ G02B 6/4201 439/357
2023/0318213 A1 * 10/2023 Lu .......................... H01R 12/79 439/634
2023/0318229 A1 * 10/2023 Lu ........................ H01R 13/639 439/660

FOREIGN PATENT DOCUMENTS

JP 2003017176 A 1/2003

* cited by examiner

*Primary Examiner* — Phuong Chi Thi Nguyen

(57) ABSTRACT

An electric connector is provided which enables a cost increase to be reduced and enables strength to be improved. The electric connector for connecting a cable to a counterpart connector includes: a connection part that is connected to an electrically conductive part of the cable, that is connected to an electrically conductive member of the counterpart connector, and that is electrically conductive; a holding member that holds the cable and the connection part; a case that covers the holding member; and a cover that covers a part of the case. The case includes an engaging arm part that is engaged with the holding member and that is elastically deformable. The cover includes regulating parts that cover the engaging arm part and regulate elastic deformation of the engaging arm part in a direction in which engagement of the engaging arm part with the holding member is released.

20 Claims, 7 Drawing Sheets

ELECTRIC CONNECTOR

The contents of the following Japanese patent application(s) are incorporated herein by reference: NO. 2022-015602 filed on Feb. 3, 2022.

FIELD

The present invention relates to an electric connector configured to connect a cable to a counterpart connector.

BACKGROUND

Known is an electric connector with a configuration in which a case is fitted in a semi-finished product holding a cable. Such an electric connector has a configuration in which a lock claw of the case is engaged with the semi-finished product. However, in such an electric connector, when a tensile load is applied to the cable, engagement of the lock claw of the case with the semi-finished product may be released, and the case may come off.

On the other hand, known is an electric connector in which a member called a retainer is added to improve the attachment strength of the case to the semi-finished product by using the retainer. However, since such an electric connector leads to an increase in the number of components, assembling the electric connector is a hassle, and the cost increases.

Under such circumstances, Patent Literature 1 discloses a plug in which a plug main body is covered with a gripping part formed by means of overmolding. With the plug in Patent Literature 1, the number of components will not be increased, and the gripping part can be prevented from coming off even in a case where a tensile load is applied to a cable.

CITATION LIST

Patent Literature

Patent Literature 1: Japanese Patent Application Laid-Open No. 2003-17176

SUMMARY

Technical Problem

However, in Patent Literature 1, a molding machine needs to be prepared to form the gripping part, and molding processing needs to be performed with use of the prepared molding machine. This causes a problem in which the manufacturing process is complicated, and in which the cost increases.

An object of the present invention is to provide an electric connector which enables a cost increase to be reduced and enables the strength to be improved.

Solution to Problem

An electric connector according to an aspect of the present invention is an electric connector configured to connect a cable to a counterpart connector and includes a connection part that is connected to an electrically conductive part of the cable, that is connected to an electrically conductive member of the counterpart connector, and that is electrically conductive, a holding member configured to hold the cable and the connection part, a case configured to cover the holding member, and a cover configured to cover a part of the case. The case includes a first engaging part that is elastically deformed with respect to the holding member and that is engaged with the holding member. The cover includes a regulating part configured to cover the first engaging part and to regulate elastic deformation of the first engaging part in a direction in which engagement of the first engaging part with the holding member is released.

In a case where the cable is, for example, pulled to cause a load to be applied in a direction in which engagement of the first engaging part with the holding member is released, movement of the first engaging part in a direction in which engagement of the first engaging part is released is regulated by the regulating part.

According to the aspect of the present invention, a cost increase can be suppressed, and the strength can be improved.

DESCRIPTION OF EMBODIMENTS

Figure 1:
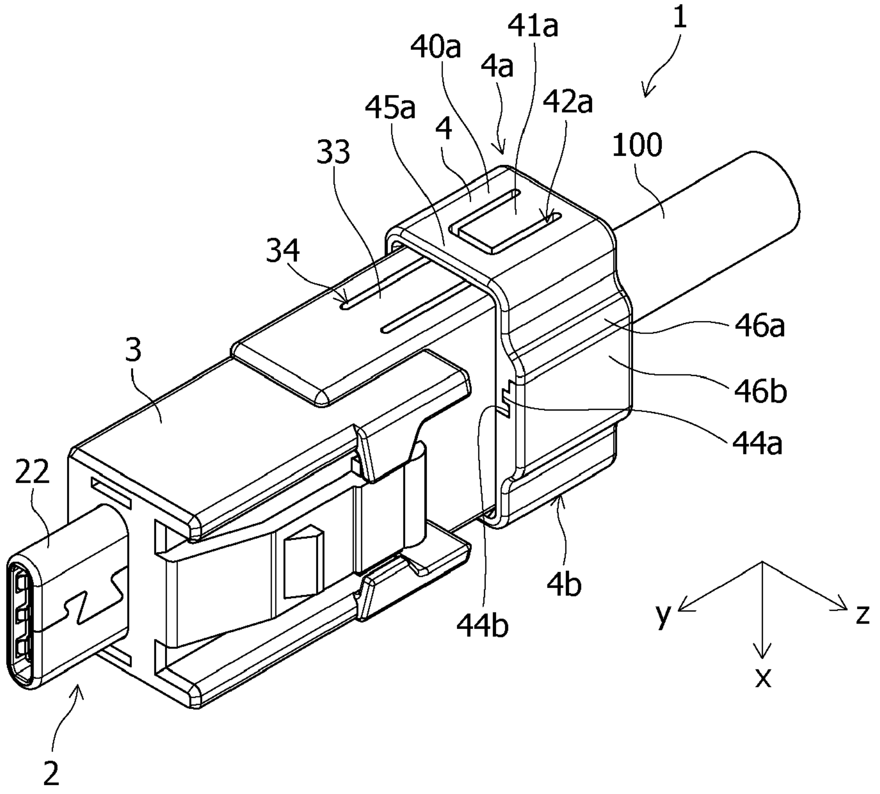
FIG. 1 is a perspective view of an electric connector according to an embodiment of the present invention.
Figure 2:
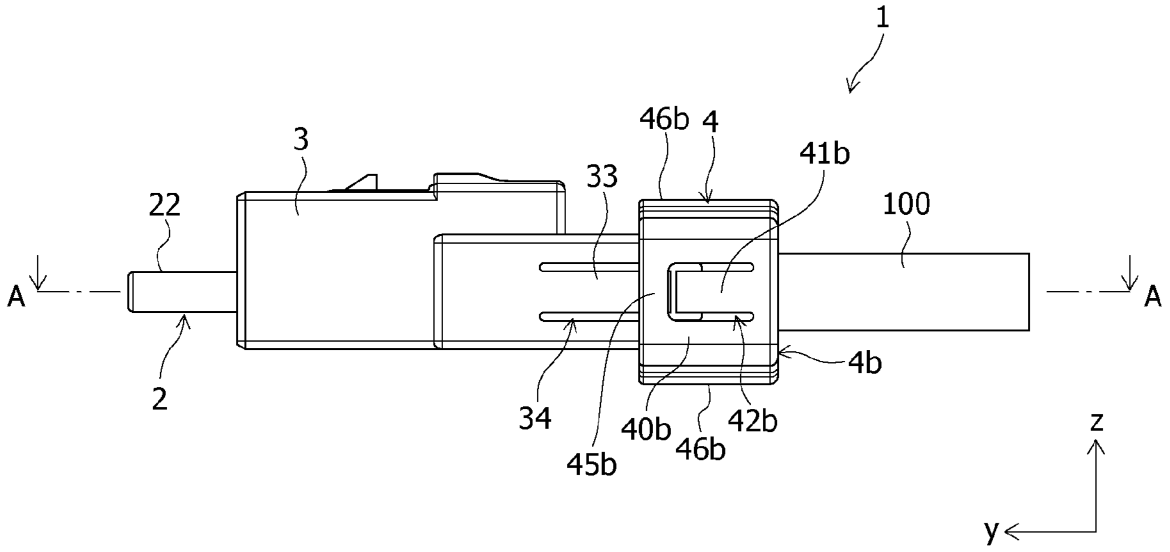
FIG. 2 is a side view of the electric connector according to the embodiment of the present invention.

Hereinbelow, an electric connector according to an embodiment of the present invention will be described in detail with reference to the drawings as needed. In the figures, the x axis, the y axis, and the z axis constitute a triaxial orthogonal coordinate system, and a description will be provided with the positive direction of the y axis being a front direction, with the negative direction of the y axis being a rear direction, with the positive direction of the x axis being a left direction, with the negative direction of the x axis being a right direction, with the positive direction of the z axis being an upward direction, and with the negative direction of the z axis being a downward direction.

<Configuration of Electric Connector>

A configuration of an electric connector 1 according to an embodiment of the present invention will be described in detail below with reference to FIGS. 1 to 13.

The electric connector 1 according to the present embodiment is used to connect a cable 100 to a not-illustrated counterpart connector and includes a cable semi-finished product 2, a case 3, and a cover 4. Here, the cable 100 includes a plurality of internal electrically conductive parts, a plurality of internal insulating parts covering the respective internal electrically conductive parts, an external electrically conductive part covering the plurality of internal insulating parts, and an external insulating part covering the external electrically conductive part, all of which are not illustrated. Note that the configuration of the cable 100 is not limited to the above-described configuration and can be an arbitrary configuration such as a configuration including a single electrically conductive part and a single insulating part.

The cable semi-finished product 2 holds the cable 100 and includes connection terminals 21, a connection part 22, and a holding member 23.

A plurality of connection terminals 21 are provided. The connection terminals 21 are connected to the plurality of internal electrically conductive parts of the cable 100, respectively, and are connected to not-illustrated electrically conductive parts of the counterpart connector when the electric connector 1 is connected to the counterpart connector.

The connection part 22 is cylindrical and is provided around the connection terminals 21. The connection part 22 is connected to the external electrically conductive part of the cable 100 and is connected to a not-illustrated electrically conductive member of the counterpart connector when the electric connector 1 is connected to the counterpart connector.

The holding member 23 is made of an insulating material. The holding member 23 holds the plurality of connection terminals 21 with space in between each other and holds the connection part 22 in a state of being insulated from the connection terminals 21. The holding member 23 holds the cable 100. The holding member 23 includes an engaging wall part 231 at the rear end thereof. Note that, although the holding member 23 includes a plurality of members, the present invention is not limited to this, and the holding member 23 may include only a single member.

The case 3 covers the holding member 23. The case 3 includes a front opening part 31, a rear opening part 32, an engaging arm part 33, and a slit 34.

The front opening part 31 opens the inside of the case 3 to the outside at the front end of the case 3.

The rear opening part 32 opens the inside of the case 3 to the outside at the rear end of the case 3.

The engaging arm part 33 serving as a first engaging part is provided, extending from the middle to the rear side in the front-rear direction of the case 3 so as to be cantilevered, and is elastically deformable in the right-left direction. The engaging arm part 33 includes, at the rear end thereof, an engagement projecting part 331 projecting inwardly. The engaging arm part 33 is elastically deformed with respect to the holding member 23 and engaged with the holding member 23.

Figure 13:
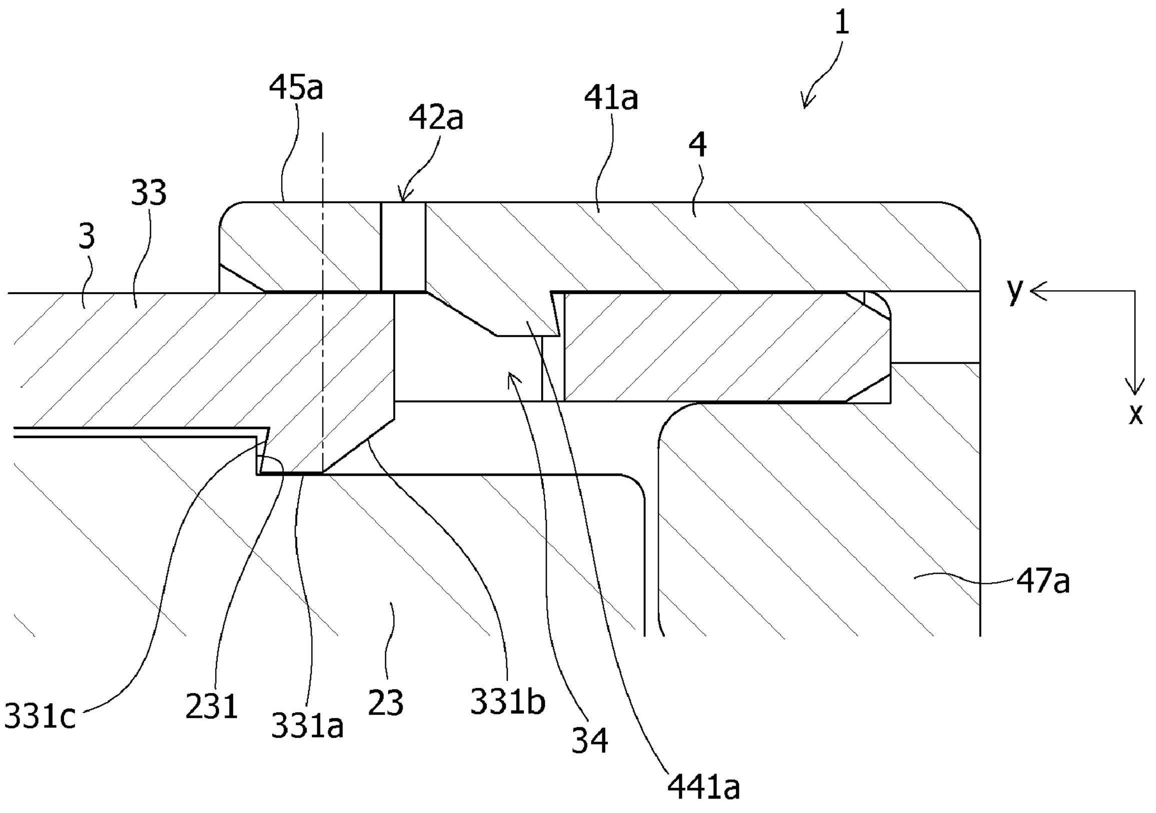
FIG. 13 is a partially enlarged cross-sectional view of the electric connector according to the embodiment of the present invention.

The engagement projecting part 331 is engaged with the engaging wall part 231 to cause the case 3 to hold the holding member 23. As illustrated in FIG. 13, the engagement projecting part 331 includes an abutting part 331*a* that abuts on the holding member 23, an inclined part 331*b* that is inclined in a direction from the abutting part 331*a* toward the rear side and away from the holding member 23 and that does not abut on the holding member 23, and an opposite wall part 331*c* that is opposed to the engaging wall part 231.

The slit 34 is provided around the engaging arm part 33 and enables the engaging arm part 33 to be elastically deformed.

The cover 4 covers the rear end side of the case 3 serving as a part of the case 3 and also closes the rear opening part 32. The cover 4 includes a first cover 4*a* and a second cover 4*b*.

The first cover 4*a* includes a covering part 40*a*, an engaging part 41*a*, a slit 42*a*, a cut-out part 43*a*, a stepped part 44*a*, a regulating part 45*a*, a thick part 46*a*, and an opposite part 47*a*.

The covering part 40*a* is a sidewall part of the cover 4 and covers the rear end of the sidewall part of the case 3.

The engaging part 41*a* is provided on the covering part 40*a*, is cantilevered, and is elastically deformable in the right-left direction. The engaging part 41*a* includes, at the front end thereof, an engagement projecting part 411*a* projecting inwardly. The engaging part 41*a* is elastically deformed with respect to the case 3 and engaged with the case 3.

The engagement projecting part 411*a* is engaged with the slit 34 of the case 3 to cause the case 3 to hold the cover 4.

The slit 42*a* is provided around the engaging part 41*a* of the covering part 40*a* and enables the engaging part 41*a* to be elastically deformed.

The cut-out part 43*a* is cut out in a semicircular shape at a rear wall part 4*c* of the first cover 4*a*.

The stepped part 44*a* is provided at the thick part 46*a* of an upper wall part 4*d* of the first cover 4*a* and the thick part 46*a* of a lower wall part 4*e* of the first cover 4*a*. The stepped part 44*a* is provided along the right-left direction. Here, the upper wall part 4*d* is a wall part of the first cover 4*a* and the second cover 4*b* on the side toward the positive direction of the z axis while the lower wall part 4*e* is a wall part of the first cover 4*a* and the second cover 4*b* on the side toward the negative direction of the z axis.

The regulating part 45*a* is provided further toward the front side than the slit 42*a* and is separated from the engaging part 41*a* by the slit 42*a*. The regulating part 45*a* is provided so as to extend in the up-down direction, which is a width direction perpendicular to a direction in which engagement of the engaging arm part 33 with the holding member 23 is released. The regulating part 45*a* is located further toward the front side than the rear end (the position in the front-rear direction illustrated by the dashed-dotted line in FIG. 13) of the abutting part 331*a* in a state in which the engagement projecting part 331 is engaged with the engaging wall part 231. The regulating part 45*a* regulates elastic deformation of the engaging arm part 33 in the right direction and in the outward direction, which are directions in which engagement of the engaging arm part 33 with the holding member 23 is released.

Figure 3:
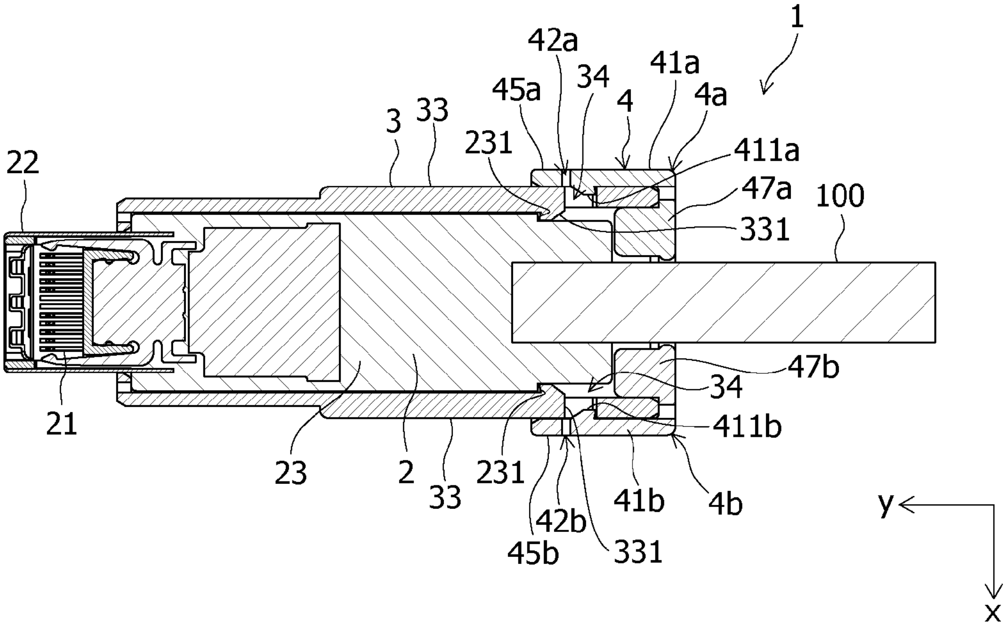
FIG. 3 is a cross-sectional view taken along line A-A in FIG. 2.
Figure 4:
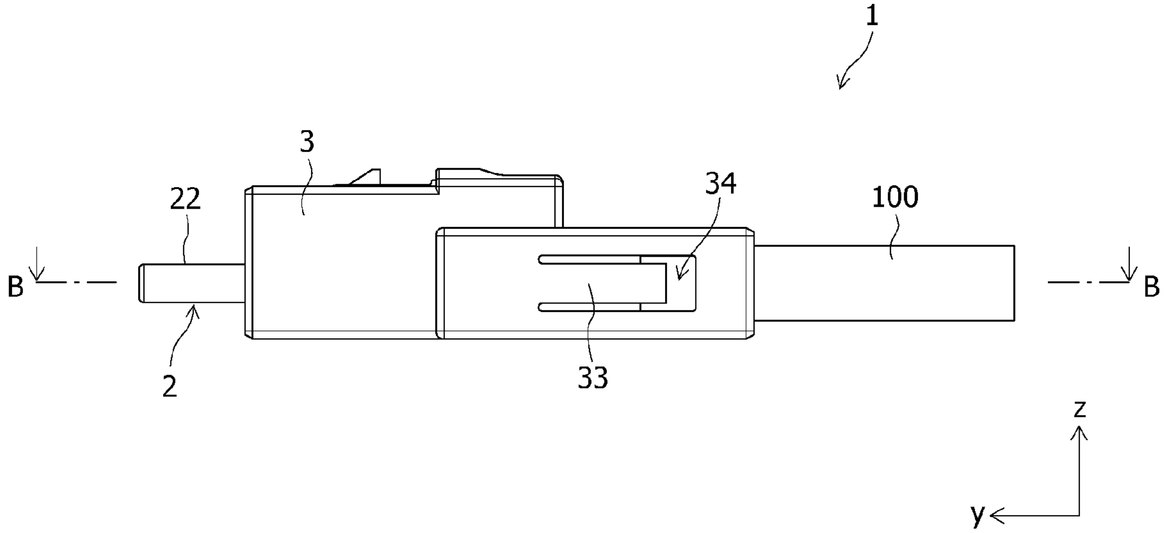
FIG. 4 is a side view of the electric connector according to the embodiment of the present invention in a state in which a cover is removed.
Figure 5:
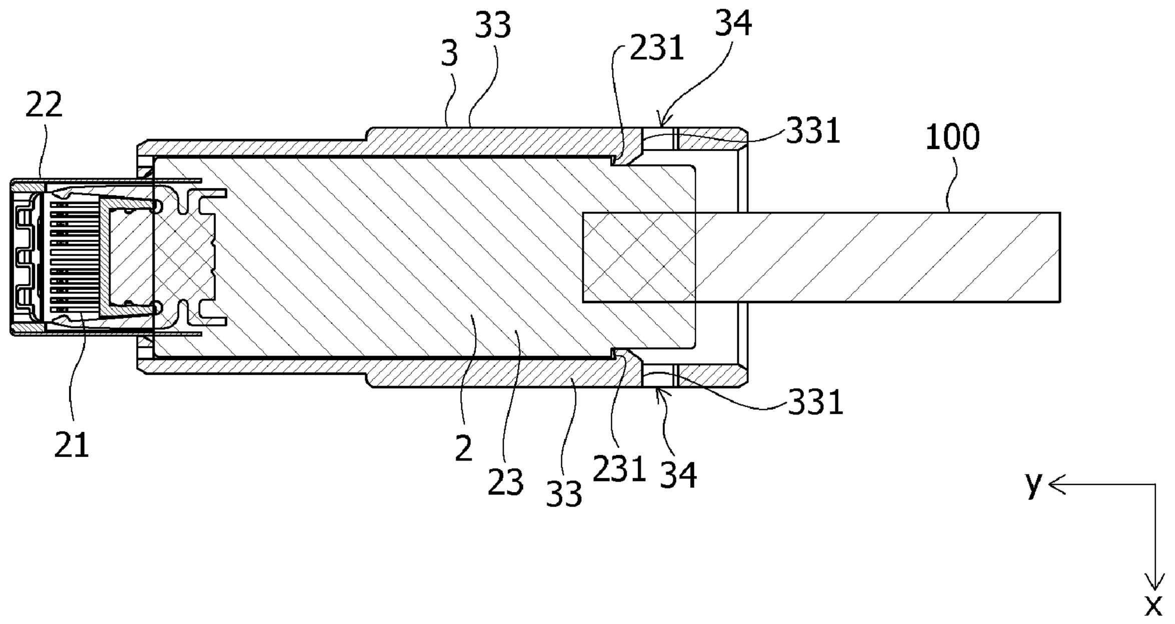
FIG. 5 is a cross-sectional view taken along line B-B in FIG. 4.
Figure 6:
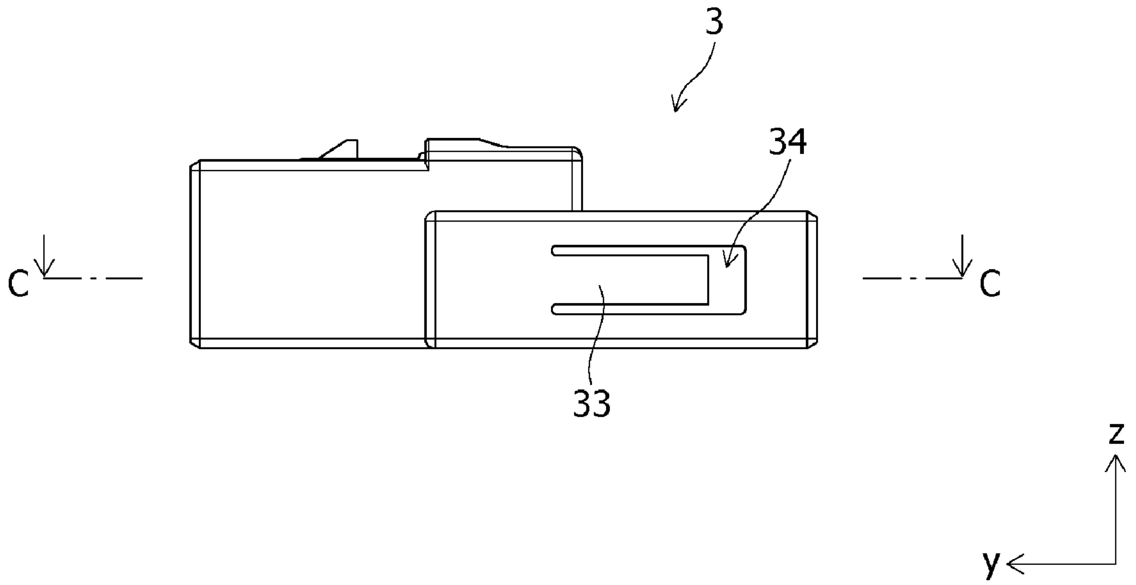
FIG. 6 is a side view of a case of the electric connector according to the embodiment of the present invention.
Figure 7:
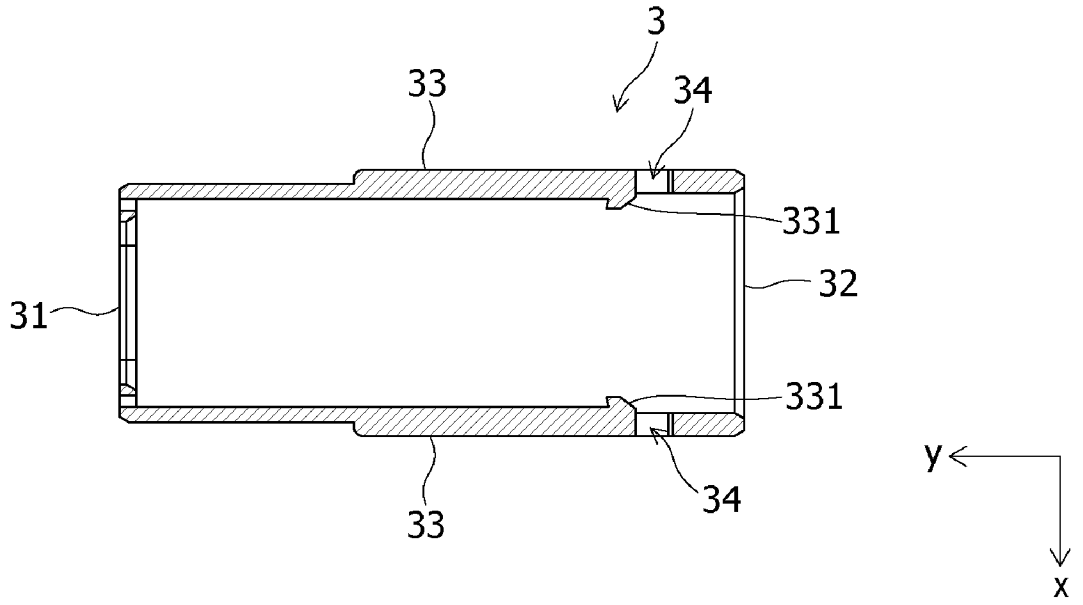
FIG. 7 is a cross-sectional view taken along line C-C in FIG. 6.
Figure 8:
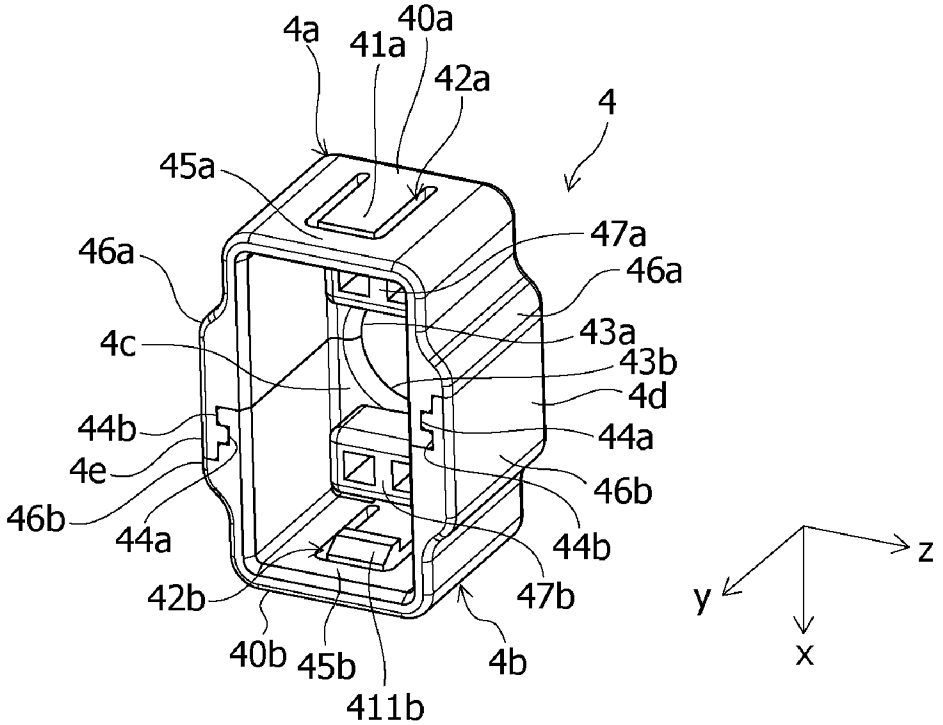
FIG. 8 is a perspective view of the cover of the electric connector according to the embodiment of the present invention as viewed from the front side.
Figure 9:
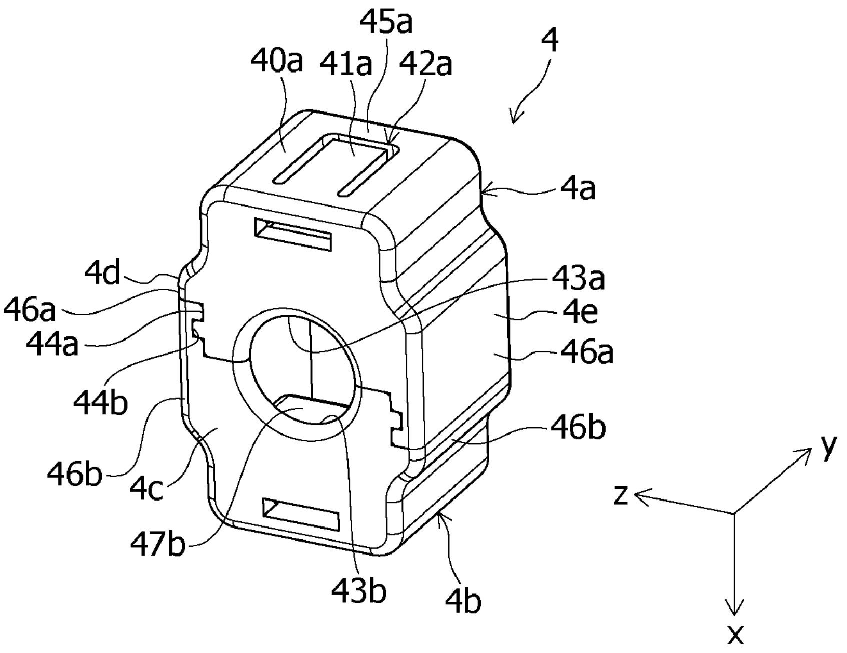
FIG. 9 is a perspective view of the cover of the electric connector according to the embodiment of the present invention as viewed from the rear side.
Figure 10:
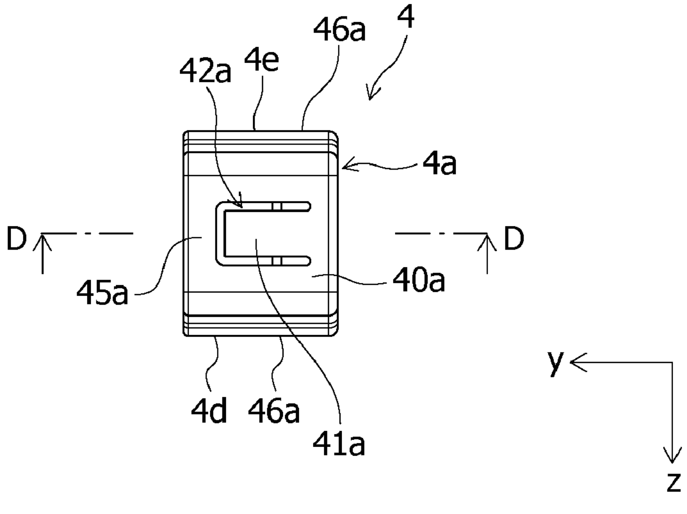
FIG. 10 is a plan view of the cover of the electric connector according to the embodiment of the present invention.
Figure 11:
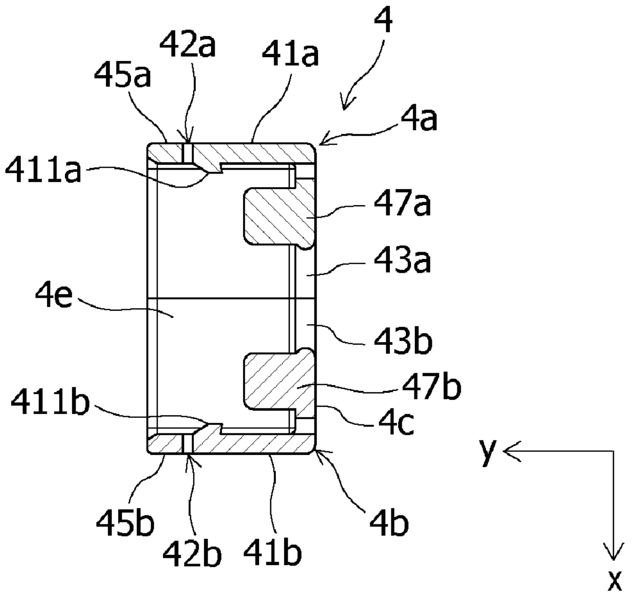
FIG. 11 is a cross-sectional view taken along line D-D in FIG. 10.
Figure 12:
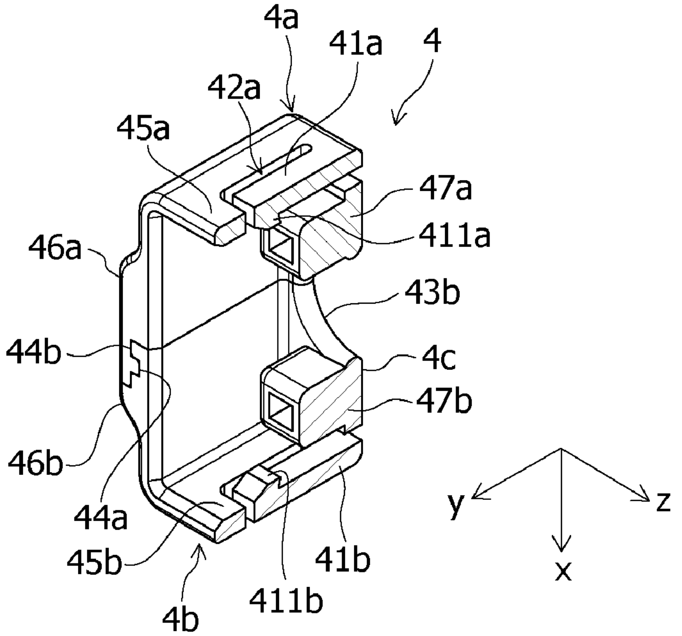
FIG. 12 is a perspective view of the cross-section taken along line D-D in FIG. 10.

Here, the direction in which engagement of the engaging arm part 33 on the upper side in FIG. 3 with the holding member 23 is released is the negative direction of the x axis, and the direction in which engagement of the engaging arm part 33 on the lower side in FIG. 3 with the holding member 23 is released is the positive direction of the x axis. Also, the width direction perpendicular to the direction in which engagement of the engaging arm part 33 with the holding member 23 is released is a direction parallel to the z axis.

The thick part 46*a* projects outwardly and is thick.

The opposite part 47*a* is opposed to the covering part 40*a* and is spaced apart from the covering part 40*a* as well as being opposed to the engaging part 41*a* and spaced apart from the engaging part 41*a*. The opposite part 47*a* is provided so as to extend further toward the front side than the rear wall part 4*c* of the first cover 4*a*.

The covering part 40*a* and the opposite part 47*a* sandwich the rear end part of the case 3 therebetween.

The second cover 4*b* includes a covering part 40*b*, an engaging part 41*b*, a slit 42*b*, a cut-out part 43*b*, a stepped part 44*b*, a regulating part 45*b*, a thick part 46*b*, and an opposite part 47*b*.

The covering part 40*b* is a sidewall part of the cover 4 and covers a part of the case 3.

The engaging part 41*b* is provided at the covering part 40*b*, is provided so as to extend to the front side to be cantilevered, and is elastically deformable in the right-left direction. The engaging part 41*b* includes at the front end thereof an engagement projecting part 411*b* projecting inwardly. The engaging part 41*b* is elastically deformed with respect to the case 3 and engaged with the case 3. Here, the engaging part 41*a* and the engaging part 41*b* constitute a second engaging part.

The engagement projecting part 411*b* is engaged with the slit 34 to cause the cover 4 to hold the case 3.

The slit 42*b* is provided around the engaging part 41*b* of the covering part 40*b* and enables the engaging part 41*b* to be elastically deformed.

The cut-out part 43*b* is cut out in a semicircular shape at the rear wall part 4*c* of the second cover 4*b*. The cut-out part 43*b* forms, at the rear wall part 4*c*, a circular penetration hole together with the cut-out part 43*a*.

The stepped part 44*b* is provided at the thick part 46*b* of the upper wall part 4*d* of the second cover 4*b* and the thick part 46*b* of the lower wall part 4*e* of the second cover 4*b*. The stepped part 44*b* is provided along the right-left direction and is formed in a protrusion-recess shape to enable the stepped part 44*b* to be engaged with the stepped part 44*a*. The stepped part 44*b* on the side with the upper wall part 4*d* covers the stepped part 44*a* on the side with the upper wall part 4*d*. The stepped part 44*b* on the side with the lower wall part 4*e* is covered by the stepped part 44*a* on the side with the lower wall part 4*e*.

The stepped part 44*a* and the stepped part 44*b* are engaged with each other to cause movement of the cover 4*a* in the right-left direction with respect to the cover 4*b* to be regulated. The stepped part 44*a* and the stepped part 44*b* are engaged with each other to cause movement of the cover 4*b* in the right-left direction with respect to the cover 4*a* to be regulated.

The regulating part 45*b* is provided further toward the front side than the slit 42*b* and is separated from the engaging part 41*b* by the slit 42*b*. The regulating part 45*b* is provided to extend in the up-down direction, which is a width direction perpendicular to a direction in which engagement of the engaging arm part 33 with the holding member 23 is released. The regulating part 45*b* is located further toward the front side than the rear end of the abutting part 331*a* in a state in which the engagement projecting part 331 is engaged with the engaging wall part 231. The regulating part 45*b* regulates elastic deformation of the engaging arm part 33 in the left direction and in the outward direction, which are directions in which engagement of the engaging arm part 33 with the holding member 23 is released.

The thick part 46*b* projects outwardly and is thick.

The opposite part 47*b* is opposed to the covering part 40*b* and is spaced apart from the covering part 40*b* as well as being opposed to the engaging part 41*b* and spaced apart from the engaging part 41*b*. The opposite part 47*b* is provided so as to extend further toward the front side than the rear wall part 4*c* of the second cover 4*b*.

The covering part 40*b* and the opposite part 47*b* sandwich the rear end part of the case 3 therebetween.

<Method for Assembling Electric Connector>

A method for assembling the electric connector 1 according to the embodiment of the present invention will be described in detail below.

First, after the cable semi-finished product 2 is prepared, the cable semi-finished product 2 is inserted into the case 3 through the rear opening part 32 of the case 3 to cover the cable semi-finished product 2 with the case 3.

When the cable semi-finished product 2 is inserted into the case 3, the engagement projecting part 331 of the engaging arm part 33 of the case 3 abuts on the sidewall of the holding member 23 to cause the engaging arm part 33 to be pressed outwardly by the sidewall of the holding member 23 and to be elastically deformed outwardly.

Thereafter, when the engagement projecting part 331 reaches the position of the engaging wall part 231 of the holding member 23, the engagement projecting part 331 is engaged with the engaging wall part 231 by an elastic returning force of the engaging arm part 33. As a result, the case 3 is attached to the cable semi-finished product 2.

Subsequently, in a state in which the cable 100 is engaged with the cut-out part 43*a* of the first cover 4*a*, and where the cable 100 is engaged with the cut-out part 43*b* of the second cover 4*b*, the stepped part 44*a* of the first cover 4*a* and the stepped part 44*b* of the second cover 4*b* mate with each other to assemble the cover 4. At this time, the stepped part 44*a* and the stepped part 44*b* mate with each other while the second cover 4*b* slides on the first cover 4*a* from the front side or the rear side.

Subsequently, the assembled cover 4 is moved to the front side to cover the case 3 with the cover 4 from the rear side.

When the case 3 is covered with the cover 4, the engagement projecting part 411*a* of the engaging part 41*a* and the engagement projecting part 411*b* of the engaging part 41*b* abut on the right and left sidewalls of the case 3 and are thus elastically deformed outwardly.

Thereafter, when the engagement projecting part 411*a* and the engagement projecting part 411*b* reach the slits 34, the engagement projecting part 411*a* and the engagement projecting part 411*b* are engaged with the slits 34 by elastic returning forces of the engaging part 41*a* and the engaging part 41*b*. Also, when the engagement projecting part 411*a* and the engagement projecting part 411*b* are engaged with the slits 34, the regulating part 45*a* and the regulating part 45*b* cover the rear ends of the engaging arm parts 33. Furthermore, the rear end of the case 3 is inserted in a space between the covering part 40*a* and the opposite part 47*a* and a space between the covering part 40*b* and the opposite part 47*b* to cause the rear end of the case 3 to be sandwiched between the covering part 40*a* and the opposite part 47*a* and be sandwiched between the covering part 40*b* and the opposite part 47*b*.

<Operation of Electric Connector>

The operation of the electric connector 1 according to the embodiment of the present invention will be described in detail below.

When the cable 100 is, for example, pulled to cause a load to be applied to the electric connector 1, the engaging arm parts 33 are designed to be elastically deformed in outward directions, which are directions in which engagement between the engagement projecting parts 331 and the engaging wall parts 231 are released, but at this time, the elastic deformation of the engaging arm parts 33 in the outward direction can be regulated by the regulating part 45*a* and the regulating part 45*b* of the cover 4.

Also, movement of the cover 4*a* and the cover 4*b* in the right and left directions is regulated by engagement between the stepped parts 44*a* and the stepped parts 44*b*. Therefore, even in a case where the regulating part 45*a* and the regulating part 45*b* are pressed outwardly by the engaging arm parts 33, the outward elastic deformation of the engaging arm parts 33 can be reliably regulated.

Also, the rear end of the case 3 is sandwiched between the covering part 40*a* and the opposite part 47*a*, and the rear end of the case 3 is sandwiched between the covering part 40*b* and the opposite part 47*b*. Therefore, when the regulating part 45*a* and the regulating part 45*b* are pressed outwardly by the engaging arm parts 33, the opposite part 47*a* and the opposite part 47*b* abut on the inner wall of the rear end of the case 3, and the outward elastic deformation of the regulating part 45*a* and the regulating part 45*b* can be prevented.

Furthermore, the regulating part 45*a* and the regulating part 45*b* are located further toward the front side than the rear ends of the abutting parts 331*a* in a state in which the engagement projecting parts 331 are engaged with the engaging wall parts 231. Therefore, the abutting parts 331*a* of the engagement projecting parts 331 can be pressed on the holding member 23 by the regulating part 45*a* and the regulating part 45*b*, and the engaging states between the engaging wall parts 231 and the engagement projecting parts 331 can reliably be maintained.

In this manner, according to the present embodiment, the case 3 includes the engaging arm parts 33 that are engaged with the holding member 23 and that are elastically deformable, and the cover 4 includes the regulating part 45*a* and the regulating part 45*b* that cover the engaging arm parts 33 and regulate elastic deformation of the engaging arm parts 33 in directions in which engagement of the engaging arm parts 33 with the holding member 23 is released. Therefore, an additional member such as a retainer and molding processing can be dispensed with. Accordingly, a cost increase can be suppressed, and the strength of the cable 100 such as tensile strength can be improved.

Also, according to the present embodiment, since the rear end side of the case 3 and the front end side of the cover 4 overlap with each other, the regulating part 45*a* and the regulating part 45*b* can be arranged approximately at the middle portion in the front-rear direction of the electric connector 1. Therefore, an influence of an external load to be applied to the regulating part 45*a* and the regulating part 45*b* can be reduced, and elastic deformation of the engaging arm parts 33 in directions in which engagement of the engaging arm parts 33 with the holding member 23 is released can be thoroughly regulated.

Also, according to the present embodiment, the regulating part 45*a* is separated from the engaging part 41*a* by the slit 42*a*, and the regulating part 45*b* is separated from the engaging part 41*b* by the slit 42*b*. Therefore, the regulating part 45*a* and the regulating part 45*b* can be independent from the engaging part 41*a* and the engaging part 41*b*, and the regulating part 45*a* and the regulating part 45*b* can be prevented from being influenced by elastic deformation of the engaging part 41*a* and the engaging part 41*b*.

Also, according to the present embodiment, since all of the four side faces of the case 3 are covered with the four side faces of the cover 4, elastic deformation of the engaging arm parts 33 in directions in which engagement of the engaging arm parts 33 with the holding member 23 is released can be regulated by the regulating part 45*a* and the regulating part 45*b* more thoroughly than in a case in which only one side face of the case 3 having the engaging arm part 33 is covered with only one side face of the cover.

It is to be understood that, in the present invention, the type, arrangement, number, and the like of each component are not limited to those in the aforementioned embodiment and can be altered as needed without departing form the scope of the invention, for example, by replacing the component with one having an equivalent effect as needed.

Specifically, although, in the above-described embodiment, the cover 4 is constituted by the first cover 4*a* and the second cover 4*b*, the present invention is not limited to this, and the cover 4 may be formed integrally. In this case, before assembling the cable semi-finished product 2, the cable 100 is inserted into the penetration hole of the rear wall part 4*c* of the cover 4 in advance.

Also, although the opposite part 47*a* and the opposite part 47*b* are provided in the above-described embodiment, the present invention is not limited to this, and the opposite part 47*a* and the opposite part 47*b* do not have to be provided.

INDUSTRIAL APPLICABILITY

The electric connector according to the present invention is suitably used for connecting a cable to a counterpart connector.

REFERENCE SIGNS LIST

- 1 electric connector
- 2 cable semi-finished product
- 3 case
- 4 cover
- 4*a* first cover
- 4*b* second cover
- 4*c* rear wall part
- 4*d* upper wall part
- 4*e* lower wall part
- 21 connection terminal
- 22 connection part
- 23 holding member
- 31 front opening part
- 32 rear opening part
- 33 engaging arm part
- 34 slit
- 40*a* covering part
- 40*b* covering part
- 41*a* engaging part
- 41*b* engaging part
- 42*a* slit
- 42*b* slit
- 43*a* cut-out part
- 43*b* cut-out part
- 44*a* stepped part
- 44*b* stepped part
- 45*a* regulating part
- 45*b* regulating part
- 46*a* thick part
- 46*b* thick part
- 47*a* opposite part
- 47*b* opposite part
- 231 engaging wall part
- 331 engagement projecting part
- 331*a* abutting part
- 331*b* inclined part
- 331*c* opposite wall part
- 411*a* engagement projecting part
- 411*b* engagement projecting part

The invention claimed is:

1. An electric connector configured to connect a cable to a counterpart connector, comprising:

a connection part that is connected to an electrically conductive part of the cable, that is connected to an electrically conductive member of the counterpart connector, and that is electrically conductive;

a holding member configured to hold the cable and the connection part;

a case configured to cover the holding member; and a cover configured to cover a part of the case, wherein the case includes a first engaging part that is elastically deformed with respect to the holding member and that is engaged with the holding member, and the cover includes a regulating part configured to cover the first engaging part and to regulate elastic deformation of the first engaging part in a direction in which engagement of the first engaging part with the holding member is released.

2. The electric connector according to claim 1, wherein:

the cover includes a covering part configured to cover the part of the case, and an opposite part that is opposed to the covering part and is spaced apart from the covering part; and the part of the case is sandwiched between the covering part and the opposite part.

3. The electric connector according to claim 1, wherein the cover includes a first cover and a second cover that is engaged with the first cover.

4. The electric connector according to claim 3, wherein:

the cover includes a covering part configured to cover the part of the case, and an opposite part that is opposed to the covering part and is spaced apart from the covering part; and the part of the case is sandwiched between the covering part and the opposite part.

5. The electric connector according to claim 3, wherein the first cover and the second cover are engaged with each other to cause movement in a direction, in which engagement is released, to be regulated.

6. The electric connector according to claim 5, wherein:

the cover includes a covering part configured to cover the part of the case, and an opposite part that is opposed to the covering part and is spaced apart from the covering part; and the part of the case is sandwiched between the covering part and the opposite part.

7. The electric connector according to claim 1, wherein the regulating part is provided so as to extend in a width direction perpendicular to a direction in which engagement is released.

8. The electric connector according to claim 7, wherein:

the cover includes a covering part configured to cover the part of the case, and an opposite part that is opposed to the covering part and is spaced apart from the covering part; and the part of the case is sandwiched between the covering part and the opposite part.

9. The electric connector according to claim 7, wherein the cover includes a first cover and a second cover that is engaged with the first cover.

10. The electric connector according to claim 9, wherein the first cover and the second cover are engaged with each other to cause movement in a direction, in which engagement is released, to be regulated.

11. The electric connector according to claim 9, wherein:

the cover includes a covering part configured to cover the part of the case, and an opposite part that is opposed to the covering part and is spaced apart from the covering part; and the part of the case is sandwiched between the covering part and the opposite part.

12. The electric connector according to claim 1, wherein:

the cover includes a second engaging part that is elastically deformed with respect to the case and that is engaged with the case, and a slit that is provided around the second engaging part and that enables the second engaging part to be elastically deformed; and the regulating part is separated from the second engaging part by the slit.

13. The electric connector according to claim 12, wherein:

the cover includes a covering part configured to cover the part of the case, and an opposite part that is opposed to the covering part and is spaced apart from the covering part; and the part of the case is sandwiched between the covering part and the opposite part.

14. The electric connector according to claim 12, wherein the cover includes a first cover and a second cover that is engaged with the first cover.

15. The electric connector according to claim 14, wherein the first cover and the second cover are engaged with each other to cause movement in a direction, in which engagement is released, to be regulated.

16. The electric connector according to claim 14, wherein:

the cover includes a covering part configured to cover the part of the case, and an opposite part that is opposed to the covering part and is spaced apart from the covering part; and the part of the case is sandwiched between the covering part and the opposite part.

17. The electric connector according to claim 12, wherein the regulating part is provided so as to extend in a width direction perpendicular to a direction in which engagement is released.

18. The electric connector according to claim 17, wherein:

the cover includes a covering part configured to cover the part of the case, and an opposite part that is opposed to the covering part and is spaced apart from the covering part; and the part of the case is sandwiched between the covering part and the opposite part.

19. The electric connector according to claim 17, wherein the cover includes a first cover and a second cover that is engaged with the first cover.

20. The electric connector according to claim 19, wherein the first cover and the second cover are engaged with each other to cause movement in a direction, in which engagement is released, to be regulated.

* * * * *